United States Patent Office 3,328,877
Patented July 4, 1967

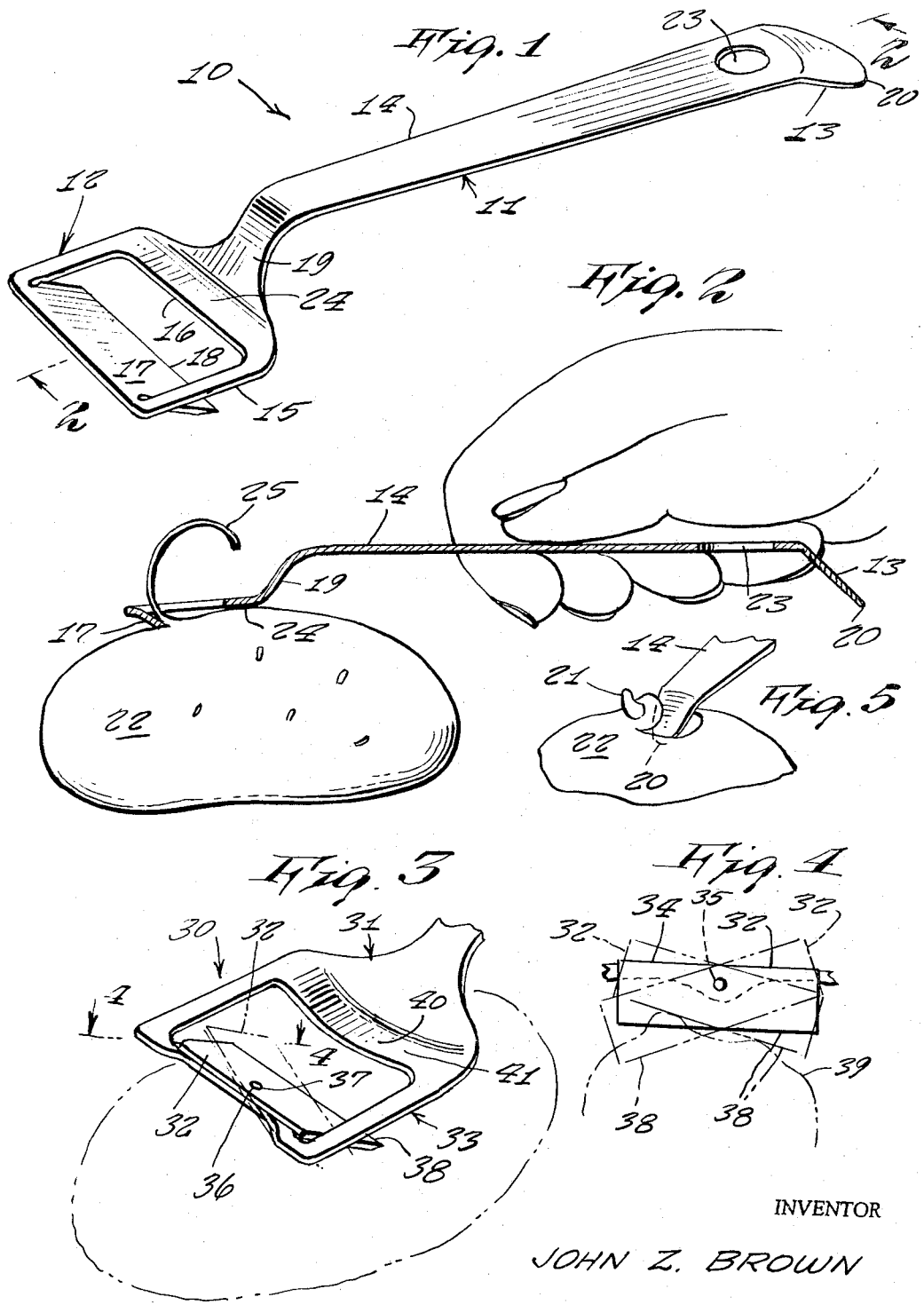

3,328,877
DRAW PEEL DEVICE
John Z. Brown, Rte. 3, Hasty Road,
Laurinburg, N.C. 28352
Filed June 27, 1966, Ser. No. 560,777
1 Claim. (Cl. 30—142)

ABSTRACT OF THE DISCLOSURE

A knife for peeling fruits and vegetables, including a one piece draw handle and frame having a transverse extending blade centrally pivoted on the frame, and the frame being transversely arched downward at its center so to serve as a guide during oscillation of the blade as it travels over irregular surfaces such as on a potato during peeling operation.

This invention relates to kitchen tools and culinary implements. More specifically it relates to paring knives.

A principal object of the present invention is to provide a vegetable and fruit peeling device which is manually drawn across the surface thereof and which removes a peel therefrom which is of a controlled thickness so as to conserve the edible portion.

Another object of the present invention is to provide a draw peel device which incorporates a potato eye digger at the opposite end of the tool.

Yet another object is to provide a draw peel device which has an oscillating blade that automatically adjusts itself laterally to the drawing direction so to accommodate the cutting edge at all times to the contour of the irregular surface of a potato or other object.

Yet another object is to provide a draw peel device that can accomplish a peeling operation in a relatively quick time, and with no special effort or concentrated attention.

Other objects are to provide a draw peel device that is simple in design, inexpensive to manufacture, rugged in construction, easy to use and efficient in operation.

These and other objects will be readily evident upon a study of the following specification and the accompanying drawing wherein:

FIGURE 1 is a perspective view of the invention;

FIGURE 2 is a cross sectional view taken on line 2—2 of FIGURE 1;

FIGURE 3 is a fragmentary perspective view of a modified form of the invention;

FIGURE 4 is a view taken in direction 4—4 of FIGURE 3, and

FIGURE 5 is a fragmentary perspective view of the potato eye digger in operative use.

Referring now to the drawing in detail, the numeral 10 represents a draw peel device according to the present invention wherein there is shown in FIGURES 1, 2 and 5 a one-piece member 11 including a peeler portion 12 at one end, a potato eye digger 13 at the opposite end, and a handle portion 14 therebetween.

The member 11 is made preferably from sheet steel stock of sufficient thickness that is stamped and drawn to the configuration shown in the drawing.

The peeler portion 12 includes a flat panel 15 the center of which is die cut as shown at 16 to form a diagonally downward extending blade 17 having a straight cutting edge 18 at its rear.

The handle portion 14 comprises an elongated flat member that is parallel to panel 15 and separated therefrom by a diagonal portion 19 therebetween.

The potato digger 13 comprises a diagonally downward extending terminal portion that is rounded at its end 20 to serve as a implement for removing eyes 21 from pototoes 22, as shown in FIGURE 5.

A hole 23 in the handle provides means for hanging up the tool upon a hook, if preferred, when not in use.

In operative use, to peel a vegetable or fruit the tool is grasped in the hand, as shown in FIGURE 2, and then drawn across the object with the shoulder 24 of the panel 15 resting against the object surface to serve as a guide for the depth of the cut into the object and produce a peel 25 of relatively uniform thickness as the cutting edge 18 digs under the surface.

In a modified construction 30, shown in FIGURES 3 and 4 the tool includes a one piece member 31 somewhat similar as described above, but wherein the blade 32 is a separately made part. In this form of the invention, the panel comprises a four sided frame 33, one side 34 of which has an opening 35 therein to receive a rivet 36 extending through an opening 37 in the blade 32 which is free to pivot thereupon so that the cutting edge 38 thereof will follow the changing contour 39 of the fruit or vegetable as it is drawn thereacross. It will be noted in FIGURE 3 that in this form of the invention the shoulder 40 of the side 41 of the frame 33 is upwardly arched at its ends so that as the blade oscillates sidewardly in use, the shoulder will provide a constantly same depth guide for the blade.

The novel features and the operation of this device will be apparent from the foregoing description. While the device has been shown and the structure described in detail, it is obvious that this is not to be considered limited to the extent form disclosed, and that changes may be made therein within the scope and the spirit of the invention.

Having thus set forth and disclosed the nature of this invention, what is claimed is:

In a draw peel device, the combination of a peeler portion, a potato eye digger portion and a handle portion therebetween, said handle portion comprising an elongated, flat element extending in a longitudinal direction, said potato eye digger portion comprising a diagonally extending portion relative to said handle portion and adjacent to one end thereof, said potato eye digger portion having a rounded terminal end for gouging under the surface of a vegetable or fruit to remove undesirable parts thereof, and said peeler portion comprising a frame integrally formed at an opposite end of said handle portion, said frame having a central opening a blade within said opening, said blade extending in a transverse direction respective to said longitudinal direction, said blade having a straight cutting edge and being centrally pivoted about a rivet carried by a transverse extending rear side of said frame, a transverse extending front side of said frame being downwardly arched at its midportion to form a shoulder for bearing against a fruit or vegetable for guiding the depth of cut of said blade, said rear side and its supported blade being angularly inclined with the blade's said cutting edge extending forwardly and downwardly, and said blade being pivotable about said rivet to conform to the irregularity of contour of said fruit or vegetable surface for peeling a relatively same thickness throughout of skin therefrom.

References Cited

UNITED STATES PATENTS

| 423,150 | 3/1890 | Haines | 30—280 X |
| 1,668,478 | 5/1928 | Anderson | 30—280 |
| 2,791,026 | 5/1957 | Byrd | 30—280 X |
| 2,804,686 | 9/1957 | Peckhover | 30—280 |

FOREIGN PATENTS 1,280,928  11/1961  France.

JAMES L. JONES, JR., *Primary Examiner.*